US008731292B2

(12) United States Patent
Ren et al.

(10) Patent No.: US 8,731,292 B2
(45) Date of Patent: May 20, 2014

(54) METHOD AND APPARATUS FOR COMPARING VIDEOS

(75) Inventors: Yansong Ren, Plano, TX (US); Fangzhe Chang, Edison, NJ (US); Thomas L. Wood, Colts Neck, NJ (US)

(73) Assignee: Alcatel Lucent, Paris (FR)

( * ) Notice: Subject to any disclaimer, the term of this patent is extended or adjusted under 35 U.S.C. 154(b) by 513 days.

(21) Appl. No.: 12/986,728

(22) Filed: Jan. 7, 2011

(65) Prior Publication Data

US 2012/0177296 A1 Jul. 12, 2012

(51) Int. Cl.
*G06K 9/00* (2006.01)
*H04N 7/26* (2006.01)
*H04N 7/36* (2006.01)

(52) U.S. Cl.
CPC .............. *H04N 19/00436* (2013.01); *H04N 19/00618* (2013.01)
USPC .......................................... 382/171; 382/145

(58) Field of Classification Search
USPC .......................................................... 382/190
See application file for complete search history.

(56) References Cited

U.S. PATENT DOCUMENTS

| 2004/0258397 | A1* | 12/2004 | Kim | 386/94 |
| 2005/0078868 | A1* | 4/2005 | Chen et al. | 382/171 |
| 2008/0170775 | A1* | 7/2008 | Pasupuleti | 382/145 |

FOREIGN PATENT DOCUMENTS

| EP | 2 214 106 | 8/2010 |
| WO | WO 2010/078629 | 7/2010 |

OTHER PUBLICATIONS

Wu, Xiao, et al. "Practical Elimination of Near-Duplicates from Web Video Search", Proceedings of the 15th International Conference on Multimedia, Multimedia '07, Jan. 1, 2002, p. 218.
Tahayna, Bashar, et al., "An Efficient Method for Near-Duplicate Video Detection", Advances in Multimedia Information Processing—PCM 2008, Dec. 9, 2008, pp. 377-386.
International Search Report dated Jul. 2, 2012.
Zhao, Wanlei, et al., "Keyframe Retrieval by Keypoints; Can Point-to-Point Matching Help?", Dept. of Computer Science, City University of Hong Kong, pp. 72-81, Springer-Verlag Berlin Heidelberg, 2006.
Fink, Eugene, et al., "Indexing of Time Series by Major Minima and Maxima", IEEE, 2003.
Hampapur, Arun, et al., "Comparison of Sequence Matching Techniques for Video Copy Detection", IBM T. J. Watson Research Center, NY and YoungSan University, Korea, 2001.
Law-To, Julien, et al., "Video Copy Detection: a Comparative Study", CIVR '07, Amsterdam, The Netherlands 2007.

* cited by examiner

*Primary Examiner* — Hadi Akhavannik
(74) *Attorney, Agent, or Firm* — Fay Sharpe LLP

(57) ABSTRACT

In a method of comparing a query video and a target video, frames of the query video and frames of the target video are partitioned into blocks. The mean intensity value is calculated for each block. Minima and maxima values are extracted from temporal changes of the mean intensity values for each block. Inclines and declines are obtained from the minima and maxima values. The inclines and declines are used in determining if alignment exists between the query video and the target video.

23 Claims, 4 Drawing Sheets

METHOD AND APPARATUS FOR COMPARING VIDEOS

FIELD OF THE INVENTION

The present invention relates to a method and apparatus for comparing videos.

BACKGROUND video hosting website, such as, for example, YouTube, Google Video and Yahoo! Video, video content may be uploaded by users to the site and made available to others via search engines. It is believed that current web video search engines provide a list of search results ranked according to their relevance scores based on a particular a text query entered by a user. The user must then consider the results to find the video or videos of interest.

Since it is easy for users to upload videos to a host, obtain videos and distribute them again with some modifications, there are potentially numerous duplicate, or near duplicate, contents in the video searching results. Such duplicates would be considered by a user to be "essentially the same", based on their overall content and subjective impression. For example, duplicate video content may include video sequences with identical or approximately identical content but which are in different file formats, have different encoding parameters, and/or are of different lengths. Other differences may be photometric variations, such as color and/or lighting changes, and/or minor editing operations in spatial or and temporal domain, such as the addition or alteration of captions, logos and/or borders. These examples are not intended to be an exhaustive list and other types of difference may also occur in duplicate videos.

The proliferation of duplicate videos can make it difficult or inconvenient for a user to find the content he or she actually wants. As an example, based on sample queries from YouTube, Google Video and Yahoo! Video, on average it was found that there are more than 27% near-duplicate videos listed in search results, with popular being those that are most duplicated in the results. Given a high percentage of duplicate videos in search results, users must spend significant time to sift through them to find the videos they need and must repeatedly watch similar copies of videos which have already been viewed. The duplicate results depreciate users' experience of video search, retrieval and browsing. In addition, such duplicated video content increases network overhead by storing and transferring duplicated video data across network.

Research into video copy and similarity detection has been based on identifying different features and applying matching algorithms to them. In general, video copy detection techniques fall into one of two categories: pairwise keyframe comparison approaches; and sequence matching approaches.

In pairwise keyframe comparison approaches, keyframes are extracted from videos and pairwise comparison between keyframes is carried out to measure the degree of overlap between videos. Keyframe matching approaches usually segment videos into a series of keyframes to represent the videos. Each keyframe is then partitioned into regions and features are extracted from salient local regions. The features may be, for example, color, texture, corners, or shape features for each region. Keyframe matching is capable of detecting approximate copies that have undergone a substantial degree of editing, such as changes in temporal order or insertion/deletion of frames. However, since there are simply too many local features in a keyframe, it is computationally expensive to identify keyframes, extract local features from each keyframe and conduct metric distance comparison among them to match a video clip against a large number of videos in database.

Recent research has been aimed at improving the speed of keyframe matching methods by fast indexing the feature vectors or by using statistical information to reduce the dimension of feature vectors. However, for online analysis, both the cost of segmenting videos into keyframes and the cost of extracting local features from a query video are still unavoidable. It becomes a real challenge to provide online real-time video duplication detection in a Web 2.0 video hosting environment. Keyframe matching approaches are more suitable for offline video redundancy detection with line-grain analysis to aggregate and classify database videos.

In sequence matching, an interval of time with multiple frames provides a basis for comparing the similarity of a query video and a target video. Typically, this involves extracting a sequence of features, which may be, for example, ordinal, motion, color and centroid-based features, from both the query video frames and the target video frames. The extracted feature sequences are then compared to determine the similarity distance between the videos. For example, where ordinal signatures are used, each video frame is first partitioned into $N1 \times N2$ blocks and the average intensity of each block is calculated. Then, for each frame, the blocks are ranked according to their average intensities. The ranking order is considered to be that frame's ordinal measure. The sequence of ordinal measures for one video is compared with that of the other to assess their similarity.

Sequence matching enables the start of the overlapping position between duplicate videos to be determined. Sequence matching approaches are suitable for identifying almost identical videos and copies of videos with format modifications, such as coding and frame resolution changes, and those with minor editing in the spatial and temporal domains. In particular, using spatial and temporal ordinal signatures allows detection of video distortions introduced by video digitalization/encoding processes (for example, changes in color, brightness and histogram equalization, encoding parameters) and display format conversions (for example converting to letter-box or pillar-box) and modification of partial content (for example, cropping and zooming in).

In contrast to keyframe matching approaches, sequence matching approaches involve a relatively easy calculation and provide a compact representation of a frame, particularly when using ordinal measures. Sequence matching tends to be computationally efficient and real time computations may be carried out for processing live video. For example, an ordinal measure with 2×2 partitions of a frame needs only 4-dimensions to represent each frame, requiring fewer comparison points between two frames. However, video duplicate detection in video hosting websites requires comparison of a video clip with a large number of database videos and usually this must be carried out in real Sequential comparison of video ordinal signatures is a time-consuming process. To illustrate the time complexity of "sequential scanning", consider 'sliding' a shorter query video clip C against a longer target video sequence T and calculating the similarity distance at each point. Sequential scanning has a time complexity of $Q((m-n+1) \times n)$ where m is the number of data points in T, and n is the number of data points in C. Consider, for example, a query video of duration 5 mm and with 30 frames per sec which is to be compared with a set of target videos consisting of ten videos in total, each of the target videos having a duration of 10 min at 30 frames per sec. Assuming that a spatial ordinal measure with 2×2 partitions is used, sequential scanning requires approximately 24.6 billion operations. The speed of the video duplication detection process must be improved so as to provide timely response to user queries in Web 2.0 environment.

BRIEF SUMMARY

According to a first aspect of the invention, in a method of comparing a query video and a target video, frames of the query video and frames of the target video are partitioned into blocks. The mean intensity value is calculated for each block. Minima and maxima values are extracted from temporal changes of the mean intensity values for each block. Inclines and declines are obtained from the minima and maxima values. The inclines and declines are used in determining if alignment exists between the query video and the target video.

A method in accordance with the invention offers efficient video duplication detection by reducing the comparison space between two videos.

In an embodiment, the similarity distance between the query video and the target video is calculated. In one embodiment, calculation of the similarity distance between the query video and the target video is only carried out when alignment is found to exist. In an embodiment, the best similarity distance is calculated and compared with a given threshold value to determine if the query video and the target video are duplicates.

It is particularly useful to hold information concerning similarity of videos in a video data store for improving video search results, but it may also be advantageous for other purposes, for example, for organizing archived content. Video duplicate and similarity detection is useful for its potential in searching, topic tracking and copyright protection.

A method in accordance with the invention may be applied when a given video is to be added to a data store. However, it may be used to manage video content that has previously been added to the data store, so as to, for example, refine information regarding similarity of video content held by the data store.

In one embodiment, any one of the video files included in the data store may be taken as the given video file and act as a query to find similar video files in the data store.

In an embodiment, time series matching techniques are used to compress video sequences with certain important maxima and minima, obtain major inclines/declines based on those extreme points, and then find potential video matching positions by aligning a query video with target videos according to those major inclines/declines. Based on the potential alignment positions, existing video duplicate detection techniques (e.g. sequence matching approaches or pairwise keyframe comparison approaches) can be applied to calculate video similarity distances. If the best matching similarity distance is less than a threshold, the two videos may be considered as being duplicates.

By aligning major extreme points to suggest a few potential matching positions between videos, a method in accordance with the invention may reduce the video detection computation cost in two ways. Firstly, by filtering out very dissimilar videos before applying video redundancy detection techniques, and secondly by omitting many unnecessary comparisons for similar videos. Given a few potential alignment positions between two videos, the sequence matching approaches (e.g. ordinal signatures) need not scan one video through another one to find the best matching position; and for the pairwise keyframe comparison approaches, the total number of keyframes to compare with will be limited within the range of aligned positions. Thus, the proposed invention can be used with both types of video duplicate detection approaches to reduce their computation cost.

An embodiment of the invention may be used to provide a user feature in video hosting websites, or used by video content providers to keep track of royalty payments and to detect possible copyright infringements, or used by content distribution network providers to reduce network traffic and to manage the storage of video content. This invention can be adopted in existing video duplication systems to improve their processing time. It is particularly useful to hold information concerning similarity of video files in the data store for improving video search results, but it may also be advantageous for other purposes, for example, for organizing archived content. Video duplicate and similarity detection is useful for its potential in searching, topic tracking and copyright protection.

According to a second aspect of the invention, a device is programmed or configured to perform a method in accordance with the first aspect.

According to a third aspect of the invention, a data storage medium is provided for storing a machine-executable program for performing a method in accordance with the first aspect.

BRIEF DESCRIPTION OF THE DRAWINGS

Some embodiments of the present invention will now be described by way of example only, and with reference to the accompanying drawings, in which.

DETAILED DESCRIPTION

Figure 1:
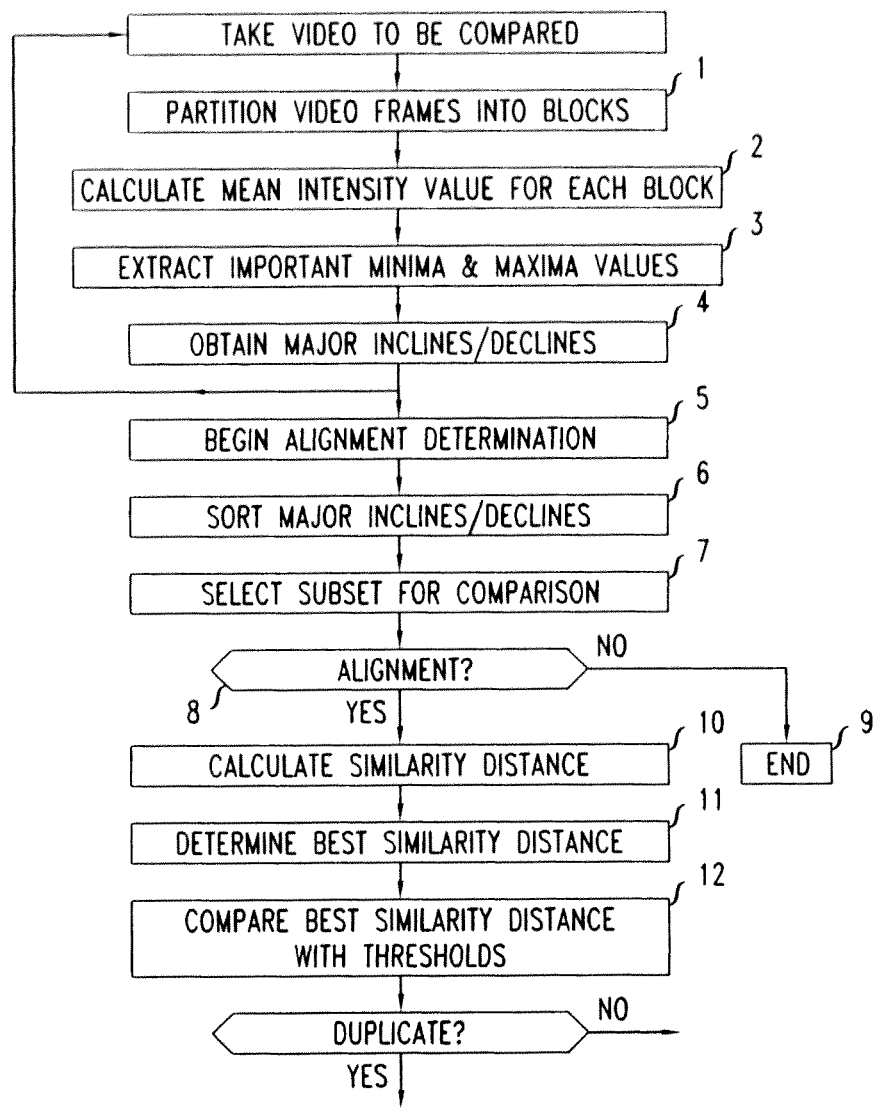
FIG. 1 schematically illustrates a method in accordance with the invention.

With reference to FIG. 1, a video that is to be involved in a duplicate video detection procedure comprises a plurality of frames. At step 1, each frame in the video is partitioned into N1×N2 blocks. At step 2, the mean intensity value for each of the blocks is calculated. Video modification techniques, such as histogram equalization, can adjust the mean value of the intensities for the whole frame into the middle value of gray scale. In such cases, the temporal change of the entire video would be flattened out and it is then not suitable for extreme points based data compression. Using temporal intensity changes from partitioned blocks avoids this problem because each of the blocks is able to retain the variations of the intensity changes in the partitioned sub region.

At step 3, important minima and maxima values are extracted from the temporal changes of the mean intensity values for each block. At step 4, major inclines/declines are obtained from the extracted minima and maxima values.

The process of selecting important minima and maxima values may be considered as a kind of data compression to capture most of the essential information representing the temporal changes of video intensities. The intention is to discard minor fluctuations by keeping only major minima and maxima and dropping the other points. Due to user modification, video distortion and format conversions, there are generally no exact matches in video duplicate detection. Ignoring minor changes of temporal intensities makes the video detection algorithm relatively insensitive to noise.

One suitable technique for extracting major extreme points is that proposed by Fink, Pratt and Gandhi in "Indexing of Time Series by Major Minima and Maxima" 2003 IEEE incorporated by reference herein.

In this technique, the compression rate is controlled by a parameter R, which is always greater than one. The definition of an important minimum is shown as follows: a point of $a_m$, of a series $a_1, \ldots, a_n$ is a minimum if there are indices i and j, where $i<=m<=j$, such that $a_m$ is the minimum among $a_i, \ldots,$ and $a_j$ and $a_i/a_m > R$ and $a_j/a_m > R$. Similarly, $a_m$ is an important maximum if there are indices i and j, where $i<=m<=j$, such that: $a_m$ is the maximum among $a_i, \ldots, a_j$ and $a_m/a_i > R$ and $a_m/a_j > R$. An increase in R leads to selection of fewer points.

This technique requires linear time and constant memory. By applying it, the values and indices of all important points can be obtained. Also, it enables new points to be processed as they arrive, without storing the original series. It can be used for online processing of a query video by extracting major extremes during the time in which a user uploads the video to a website. In other embodiments, other techniques may be used for extracting major extreme points.

The steps 1 to 4 are carried out for each of the videos that are to be involved in the duplication detection procedure.

At step 5, an attempt is made to align a query video Q with a target video T using the positions of major inclines/declines from partitioned blocks.

Since each of the videos contains N1×N2 time series, and each of those time series has a list of major inclines/declines, there are numerous major inclines/declines in a video sequence. Trying to match too few major inclines/declines will decrease the number of potential alignment positions and could result in missing matched positions. This could happen in the case of user editing (for example, insertions, deletions or substitutions) when the selected major inclines/declines could be in the outside of the overlapping frames between the duplicate videos. On the other hand, matching too many points would lead to many potential alignment positions, which will increase the time needed to calculate similarity distances in the next stage. Furthermore, since the major inclines/declines are relative information compared with the rest of inclines/declines in a video, when there is a large difference in the lengths of compared videos (for example, 30 sec compared to 2 hours), the major inclines/declines for the shorter video could be considered as non-major inclines/declines in the longer video.

To provide balance between effectiveness and efficiency, adaptive intervals are used to segment a video into a list of intervals and to select major inclines/declines within each interval. The length of interval is adaptive based on the smaller length of the compared videos. When one oldie compared videos is short, the length of interval is small. Otherwise, the length of interval is large. This technique ensures the major inclines/declines are distributed uniformly across the length of the videos. It ensures that there are major inclines/declines in the longer video representing the potential overlapping frames for the short video.

Since some blocks might contain large variations in the mean intensity values, while other blocks could have relatively minor fluctuations in intensity values, the variations of gradients in the major inclines/declines can be used to represent the amount of information that is carried within the blocks. In this embodiment, major inclines/declines are sorted at step 6 across all partition blocks in the query video Q according to their gradients. Several of the major inclines/declines with the deepest gradient changes are selected at step 7 from the sorted list to represent the query video Q during the alignment process carried out at step 8.

During the alignment process, both the relative positions between the selected major inclines/declines of query video Q and their relative gradient changes are used as criteria when matching against those in a target video T. If no alignment exists between the compared videos Q and T they are considered not to be duplicates and the matching process is terminated at 9. If alignment of the compared videos Q and T is found to be present then the duplication matching process continues.

Next, at step 10, for each of the alignment positions, the similarity distance between the query video Q and the target video T is calculated. Existing video duplicate detection techniques, such as sequence matching approaches or pairwise keyframe comparisons, may be applied to calculate the similarity distance. The best similarity distance between the query video Q and the target video T is determined at step 11. The best similarity distance is then compared to a predefined threshold value at step 12. If the best similarity distance is less than the predefined threshold value, the compared videos are considered to be duplicates.

Figure 2C:
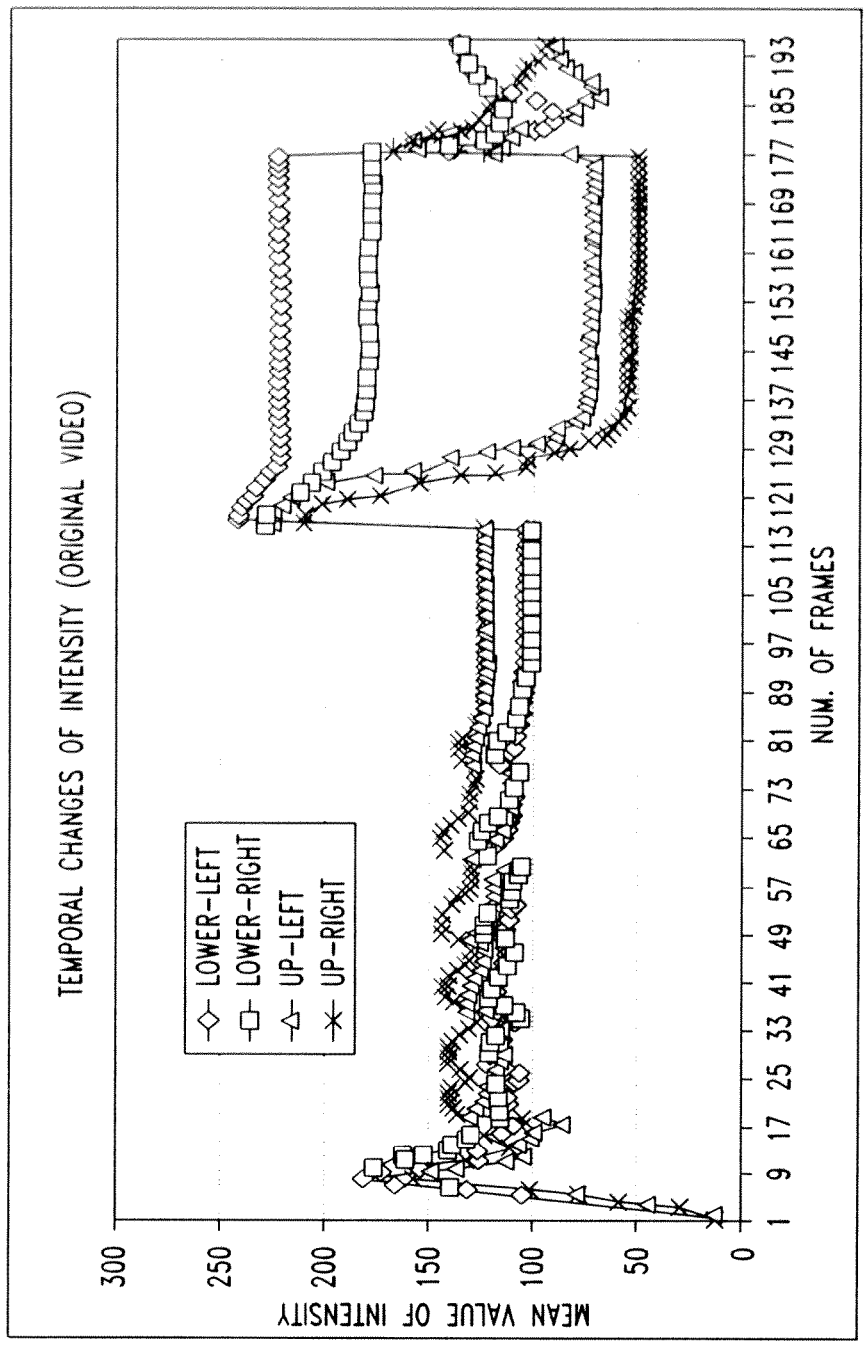
FIGS. 2a and 2c schematically illustrates temporal changes in intensity for a target video.
Figure 2A:
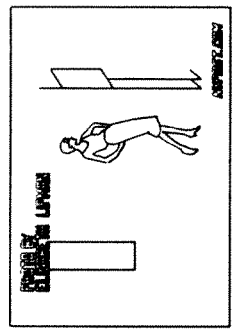
Figures 2B, 2D:
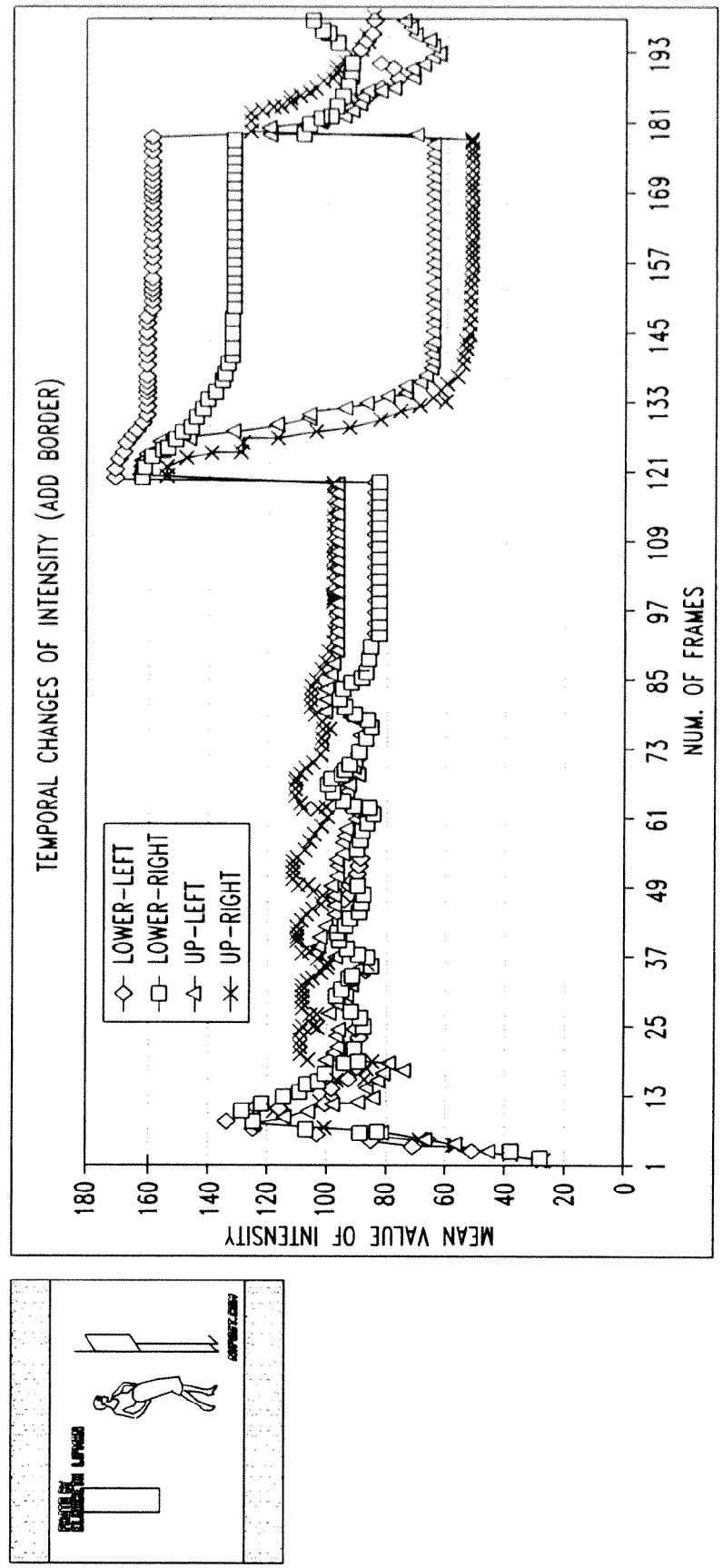
FIGS. 2b and 2d schematically illustrates temporal changes in intensity for a query video.

FIG. 2a is a representation of a target video clip and FIG. 2b is a query video which is similar to that of FIG. 2a except for the addition of a border. For each video, each frame was partitioned into 4×4 blocks, FIG. 2c shows a plot of the changes of intensities for each of the blocks for the target video FIG. 2d shows the temporal changes of intensities for the query video. It can be seen that the temporal changes of intensities for the query video follow similar traces. They can be viewed as a set of time series that contain sequences of values measured at equal time intervals During experiments with a set of duplicate videos with various types of distortions, modifications and format conversions, such as changes in brightness, color, hue, histogram equalization, adding mosaic, Gaussian noises, gamma correction, resizing and cropping of frames, and so on, methods in accordance with the invention were found to give good performances. Video duplication detection time was found to be up to about ten times faster than other previously known approaches. In addition, the same level of accuracy was retained as that provided by the previously known video duplication detection techniques.

Figure 3:
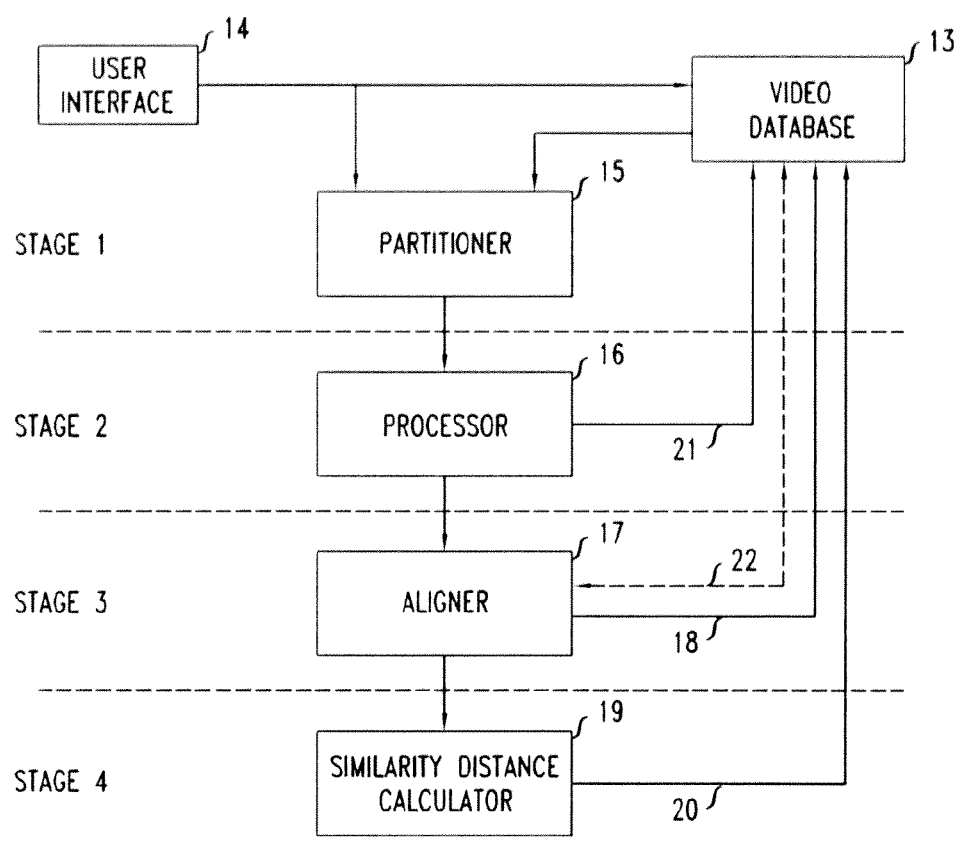
FIG. 3 schematically illustrates an apparatus for implementing the method of FIG. 1.

With reference to FIG. 3, a video management apparatus includes a database or store 13 which holds video files. The database 13 may be one which is generally accessible to users via the Internet or may, for example, be a library or other depository with restricted access. Other types of store or database may be used instead or in addition to these possibilities.

A user transmits a video Q that he or she wants to add to the database 13 by submitting the video Q via a user interface 14. The video Q is sent to the video database 13 and also to a partitioner 15.

At Stage 1 of the operation, the partitioner 15 partitions each frame of the video Q into N1×N2 blocks and calculates the mean intensity values for each of the blocks.

At Stage 2, mean intensity value data is received by a processor 16 from the partitioner 15. The processor 16 extracts important minima and maxima values from the temporal changes of the mean intensity values for each block. The processor 16 then uses the important minima and maxima values to obtain major inclines/declines.

Stage 3 is an alignment operation which aims to find possible alignments between the submitted video Q and other videos held in the database 13. An aligner 17 receives the major it inclines/declines from the processor 16 for comparison those obtained by in a similar manner for one or more target videos T stored in the database 13. The target video(s)

T may be analyzed at effectively the same time as the query video Q, the video(s) T being applied to the partitioner 15 substantially in parallel with the query video Q, so that the necessary data has been extracted from the video(s) stored in the database 13 and is available for determining if alignment with the query video Q exists by the aligner 17.

If no alignment is found between the query video Q and any target video T, a message to that effect is sent on line 18 to the video database 13 and the query video Q is accepted from the user interface 14 by the database 13 to be stored.

When alignment is found, in Stage 4, for each of the alignment positions between the query video Q and one or more target videos T, the similarity distance between the query video Q and one or more target videos T is calculated at calculator 19. The calculator 19 finds the best similarity distance among them. If the similarity distance is less than a predefined threshold, the compared videos are considered as duplicates. A message is sent on line 20 to the video database 13 to inform it as to whether or not if the query video is to be considered as a duplicate.

If the query video Q is not found to be a duplicate, the video database 13 accepts it for storage.

If the query video Q is found to be a duplicate, then in one embodiment, the video database 13 rejects it with or without a message to the user to inform them.

In an alternative embodiment, or mode, if the query video Q is found to be a duplicate, it is accepted into the video database 13 but it is denoted as a duplicate, preferably with a reference to the target video T that it matches. Duplicate videos may be collected together in a group. When a search performed on the database calls up one of the group, other group members may be suppressed from the search results or are given a lower ranking in the search results than they would otherwise merit, so that any duplicates tend to be presented after other non-duplicates.

The video management apparatus of FIG. 3 may be modified so that videos held in the video database 13 are partitioned and processed at 15 and 16 prior to the query video Q being submitted. For example, in one embodiment, data obtained when a video is submitted to be examined for duplicates may be retained and sent to be stored at the video database 13 via line 21. If that video is subsequently not accepted into the database 13, the data is deleted. When the video is accepted into the database, the data associated with it is retained and is available for use in the aligner 19 via line 22. In another embodiment, videos in the video database 13 may be partitioned and processed at 15 and 16 without necessarily having been used in testing for duplicates. For example, the data processing may be carried out as part of a preparation phase before opening the database to receive new videos.

The functions of the various elements shown in the figure, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method for comparing a query video and a target video including:
    partitioning frames of the query video and frames of the target video into blocks;
    calculating the mean intensity value for the blocks;
    extracting minima and maxima values from temporal changes of the mean intensity values for the blocks, wherein the extracted minima and maxima values are major minima and major maxima values;
    obtaining major inclines and major declines from the major minima and major maxima values; and
    determining if alignment exists between the query video and the target video using the major inclines and major declines.

2. The method as claimed in claim 1 and including calculating the similarity distance between the query video and the target video.

3. The method as claimed in claim 2 wherein calculation of the similarity distance between the query video and the target video is carried out when alignment is found to exist.

4. The method as claimed in claim 2 and including calculating the best similarity distance and comparing the best similarity distance with a given threshold value to determine if the query video and the target video are duplicates.

5. The method as claimed in claim 1 wherein non-major minima and non-major maxima values are excluded.

6. The method as claimed in claim 1, further comprising: representing the mean pixel intensity values in the corresponding blocks over video frame sequences as time series.

7. The method as claimed in claim 1 and including sorting major inclines and major declines according to their gradients and using those with greater gradients in determining alignment.

8. The method as claimed in claim 2 and including using sequence matching to determine the similarity distance.

9. The method as claimed in claim 2 and including using keyframe pair wise matching to determine the similarity distance.

10. The method as claimed in claim 1 and including segmenting the query video and the target video into a list of intervals and selecting major inclines/declines within the intervals, the interval size being adapted based on the length of the videos.

11. The method as claimed in claim 4 and including storing the query video in a video database holding the target video when the query video is determined not to be a duplicate of the target video.

12. A device programmed or configured to perform a method comprising:
    partitioning frames of the query video and frames of the target video into blocks;
    calculating the mean intensity value for the blocks;
    extracting minima and maxima values from temporal changes of the mean intensity values for the blocks, wherein the extracted minima and maxima values are major minima and major maxima values;
    obtaining major inclines and major declines from the major minima and major maxima values; and and determining if alignment exists between the query video and the target video using the major inclines and major declines.

13. The device as claimed in claim 12 and programmed or configured to calculate the similarity distance between the query video and the target video.

14. The device as claimed in claim 12 and programmed or configured such that calculation of the similarity distance between the query video and the target video is carried out when alignment is found to exist.

15. The device as claimed in claim 12 and programmed or configured to calculate the best similarity distance and to compare the best similarity distance with a given threshold value to determine if the query video and the target video are duplicates.

16. The device as claimed in claim 12 wherein non-major minima and non-major maxima values are excluded.

17. The device as claimed in claim 12 and programmed or configured represent the mean pixel intensity values in the corresponding blocks over video frame sequences as time series.

18. The device as claimed in claim 12 and programmed or configured to sort major inclines and major declines according to their gradients and to use those with greater gradients in determining alignment.

19. The device as claimed in claim 13 and programmed or configured to use sequence matching to determine the similarity distance.

20. The device as claimed in claim 13 and programmed or configured to use keyframe pair wise matching to determine the similarity distance.

21. The device as claimed in claim 12 and programmed or configured to segment the query video and the target video into a list of intervals and to select major inclines/declines within each interval, the interval size being adapted based on the length of the videos.

22. The device as claimed in claim 15 and programmed or configured to store the query video in a video database holding the target video when the query video is determined not to be a duplicate of the target video.

23. A non-transitory computer-readable medium storing a machine-executable program for performing a method of managing video content comprising:
   partitioning frames of the query video and frames of the target video into blocks;
   calculating the mean intensity value for the blocks;
   extracting minima and maxima values from temporal changes of the mean intensity values for the blocks, wherein the extracted minima and maxima values are major minima and major maxima values;
   obtaining major inclines and major declines from the major minima and major maxima values; and
   determining if alignment exists between the query video and the target video using the major inclines and major declines.

* * * * *